United States Patent [19]

Tamura et al.

[11] Patent Number: 4,639,148

[45] Date of Patent: Jan. 27, 1987

[54] THRUST BEARING FOR TURBOCHARGER

[75] Inventors: Toru Tamura, Obu; Noriyoshi Shibata, Nagoya; Toshiro Kawakami, Obu, all of Japan

[73] Assignee: Aisin Seiki Kabushiki Kaisha, Kariya, Japan

[21] Appl. No.: 697,526

[22] Filed: Feb. 1, 1985

[30] Foreign Application Priority Data

Feb. 24, 1984 [JP] Japan .................. 59-024557[U]

[51] Int. Cl.[4] .................. F16C 17/04; F16C 32/06; F16C 33/10
[52] U.S. Cl. .................. 384/420; 384/112; 384/123; 384/368
[58] Field of Search .............. 384/420, 428, 424, 368, 384/369, 228, 241, 286, 100, 111, 112, 113, 118, 121, 123

[56] References Cited

U.S. PATENT DOCUMENTS

| | | | |
|---|---|---|---|
| 2,752,208 | 6/1956 | Wightman | 384/369 X |
| 2,872,256 | 2/1959 | Thomson | 384/420 |
| 2,953,416 | 9/1960 | Collins et al. | 384/368 X |
| 3,834,156 | 9/1974 | Cutler et al. | 60/605 |
| 4,358,253 | 11/1982 | Okano et al. | 384/368 X |
| 4,453,837 | 6/1984 | Shimizu et al. | 384/368 X |
| 4,479,728 | 10/1984 | Miller | 384/369 |

Primary Examiner—Stuart S. Levy
Assistant Examiner—Lynn M. Schacki
Attorney, Agent, or Firm—Oblon, Fisher, Spivak, McClelland, & Maier

[57] ABSTRACT

A thrust bearing for an automobile turbocharger and which sustains a thrust load of the rotor shaft of the turbocharger. The thrust bearing has a first groove for holding lubricating oil supplied to the bearing. A first oil passage extends from the groove toward the axis of the rotor shaft. A second oil passage communicates with the first passage and has oil holes formed therein that extend to tapering lands formed on surfaces on which the rotor shaft bears. The second passage is so disposed that oil is spouted on both sides of the bearing. The lower end portion of the bearing is cut out portion to facilitate removal of oil. The cut out portion constitutes a planar portion of a closed loop on a surface of the bearing. A second groove is formed in the thrust bearing to hold oil discharged from the oil holes to some extent.

3 Claims, 7 Drawing Figures

THRUST BEARING FOR TURBOCHARGER

BACKGROUND OF THE INVENTION

1. Field of the Invention

The present invention relates to a thrust bearing for an automotive turbocharger.

2. Discussion of the Background

In recent years, automotive turbochargers have been increasingly used, and they are installed even in some subcompacts. There is now an increased demand for smaller and lighter turbochargers. Also, in order to operate the turbocharger efficiently from a lower rotational frequency of an engine, the rotational frequency of the turbocharger has tended to be increased. Further, there is a demand for a turbocharger that rotates at a quite high speed of 250,000 rmp. A thrust bearing having special functions is therefore needed to attain rotation of such a high speed.

Specifically, the thrust bearing must be strong enough to withstand a moving load which is applied axially of the rotor shaft of a turbocharger. Further, the bearing must be shaped so as not to adversely affect the performance of the oil seal on the side of a compressor. Conventional thrust bearings are shown in FIGS. 1 and 2 in front elevation. The bearing shown in FIG. 1 takes a circular form and has a plurality of surfaces 2 to which thrust load is applied. The surfaces 2 are formed around a hole 1 extending along the axis. In the bearing shown in FIG. 2, the lower portion is cut out so that an access can be had to a hole 1 extending along the axis to facilitate its installation on a rotor shaft. Either bearing is also formed with an oil passage 3.

The thrust bearing shown in FIG. 1 has a large surface area, because it is circular in shape. Therefore, oil tends to adhere to the surface, and it cannot be readily removed. The bearing shown in FIG. 2 has a smaller surface area because of the cutout in its lower portion, to get rid of the drawback with the bearing shown in FIG. 1. However, air within the lower cutout is introduced into the bearing during rotation of it. The air then accumulates in the form of bubbles within a chamber which should be filled with oil. Thus, the volume occupied by oil is reduced, creating deteriorations of the performance of the oil seal, including lack of lubricating oil on the thrust bearing.

SUMMARY OF THE INVENTION

It is a general object of the present invention to provide a thrust bearing for a turbocharger, the bearing is free of the foregoing difficulties with the prior art thrust bearings.

It is a more specific object of the invention to provide a thrust bearing used for a turbocharger and having a closed-loop structure that has its lower portion cut out to decreases its area and prevent air from being drawn in.

These objects are achieved by a thrust bearing for sustaining thrust load of the rotor shaft of a turbocharger, the thrust bearing comprising: a first groove formed in one side surface of the bearing for holding lubricating oil supplied to the bearing; at least one first oil passage extending from the groove toward the axis of the rotor shaft; at least one second oil channel communicating with the first passage and having oil holes that extend to tapering lands formed on surfaces on which the rotor shaft bears, the second channel being so disposed that oil is spouted on both sides of the bearing; a cutout formed in the lower end portion of the bearing; and a planar portion formed in the end surface of the thrust bearing and forming a portion of a closed loop to prevent air and other materials from being drawn into the lubricating oil discharged from the second passage; and a second groove formed between the planar portion and the surfaces on which the shaft bears.

The aforementioned second oil channel is formed in the land having a tapering portion such that the thrust clearance decreases in the direction of rotation, in order to obtain a bearing load capacity due to wedged film effect according to the rotation of the rotor shaft. Oil is caused to flow into the bearing from the oil channel for lubricating purposes. Then, the oil is scattered over the outer peripheral portion by the rotation of the rotor shaft. Subsequently, the oil is smoothly discharged through the cutout without forcing air into the oil on account of the closed-loop form.

As thus far described, in the novel structure according to the invention, the bearing is provided with holes for supplying oil and also with tapering lands that exhibit the wedged film effect. Further, the bearing is shaped into the closed loop. Hence, a stable bearing load capacity can be obtained in such a way that air is not drawn in. In addition, the cutout facilitates the removal of oil. Consequently, the thrust bearing has advantages over the prior art bearings with respect to discharge of oil, i.e., the performance of oil seal, and bearing load capacity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
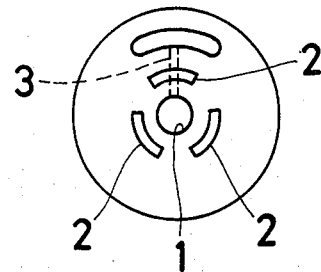
FIGS. 1 and 2 are front elevational views of conventional thrust bearings.
Figure 2:
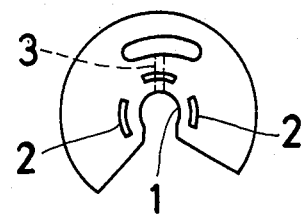
Figure 4:
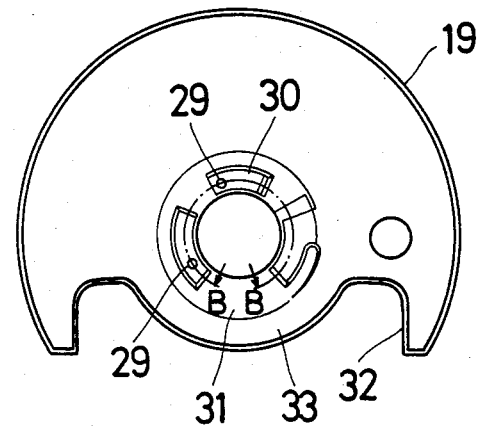
FIG. 4 is a front elevational view of the bearing of FIG. 3 as viewed from the left side.
Figure 3:
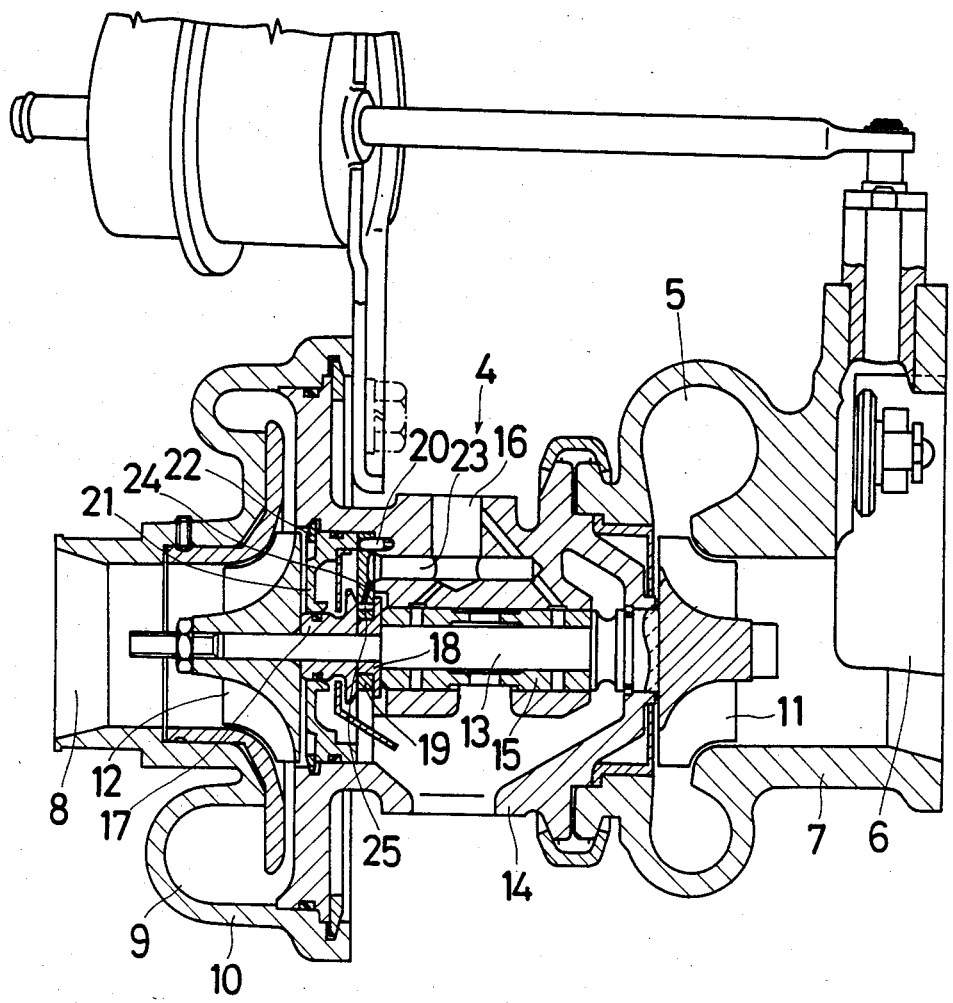
FIG. 3 is a side elevation in cross section of a turbocharger according to the present invention.
Figure 5:
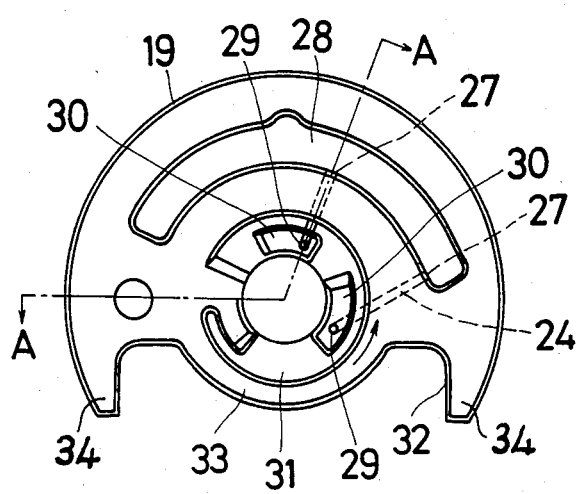
FIG. 5 is a front elevational view of the bearing of FIG. 3 as viewed from the right side.
Figure 6:
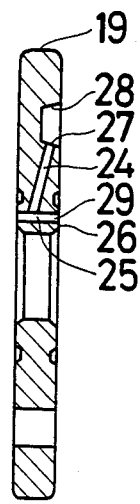
FIG. 6 is a cross-sectional view taken along the line A—A of FIG. 5.
Figure 7:
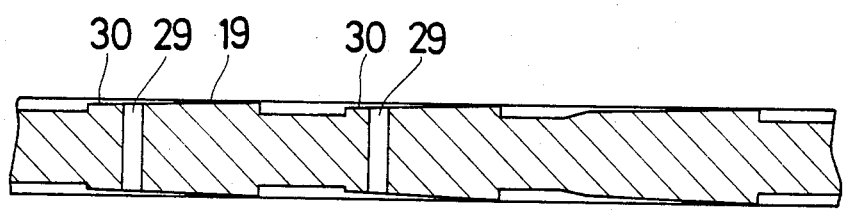
FIG. 7 is an expanded cross sectional view taken along the line B—B of FIG. 4.

Referring to FIG. 3, there is shown a turbocharger, generally indicated by numeral 4, embodying the concept of the invention. This turbocharger 4 comprises a turbine housing 7, a compressor housing 10, and a bearing housing 14 that supports a rotor shaft 13 between the housings 7 and 10. The turbine housing 7 has an exhaust inlet 5 and an exhaust exit 6 for an exhaust passage through which gas produced by combustion in an engine passes. An air intake 8 for the intake passage of the engine and an exit 9 for pressurized air are formed in the compressor housing 10. The shaft 13 has a turbine rotor 11 mounted at its one end, the rotor being mounted in the exhaust passage in the housing 7. Mounted to the other end of the shaft 13 is a compressor rotor 12 situated in the intake passage in the housing 10.

A radial bearing 15 is disposed on the outer periphery of the rotor shaft 13 substantially in the center of the shaft within the bearing housing 14 which is opposite to the shaft 13. The radial bearing 15 can rotate while carrying the shaft 13 inside the housing 14. An oil passage 16 is formed in the housing 14 to supply oil to the bearing 15.

First and second thrust bearing bushes 17 and 18, respectively, which can rotate with the rotor shaft 13 are mounted in the thrust bearing on the compressor side. Disposed between the bushes 17 and 18 is a thrust bearing 19 that is made fixed by a pin 20 so as not to rotate. Further, the bearing 19 is held stationary in the bearing housing 14 by a snap ring 22 via a seal plate 21 to prevent axial movement of the bearing 19. Oil passages 23, 24, and 25 communicating with the oil passage 16 are provided to supply oil to the thrust bearing 19 during rotation of the shaft 13.

The thrust bearing 19 is now described in detail by referring to FIGS. 4-7. The bearing 19 is asymmetrically shaped and is provided with a groove 28 for holding oil supplied from the oil passage 23. The oil passage 25 acts to furnish oil to the surfaces 26 of the bearing on which the first and second thrust bushes 17 and 18 bear. The passage 25 is in communication with an oil channel 24 having an oil hole 27 at its one end. The hole 27 opens into the groove 28. Other oil holes 29 are formed at both ends of the oil passage 25 and extend to both surfaces of the bearing 19. The holes 29 extend from lands having land portions 30 which are shaped so that the thrust clearance decreases in the direction of rotation of the shaft, in order to obtain a bearing load capacity due to wedged film effect according to the rotation of the rotor shaft 13. The holes 29 are formed in proximity to a point of maximum thrust clearance of the tapering portions 30. A groove 31 is formed to hold the oil discharged from the holes 29 to some extent.

The oil which is drawn in from the oil holes 29 lubricates the bearing. Subsequently, the oil is splashed over the outer peripheral portion when the rotor shaft 13 and the thrust bushes 17 and 18 are turned. The lower portion of the bearing is cut out at 32 and forms leg portions 34, 34 so that the splashed oil may be smoothly discharged. A planar portion for forming a closed loop is formed in the surface of the thrust bearing 19 so as to form a fluid seal so that air may not be drawn into the thrust bearing when the shaft 13 is rotating.

As can be understood from the description thus far made, the novel arrangement of the oil grooves for holding oil, the tapering lands, and oil holes, and the improved shape of the oil discharge passage permit it to obtain a more stable load bearing capacity. Further, oil can be readily removed from the thrust bearing.

Obviously, numerous modifications and variations of the present invention are possible in light of the above teachings. It is therefore to be understood that within the scope of the appended claims, the invention may be practiced otherwise than as specifically described herein.

What is claimed is:

1. A thrust bearing for sustaining the thrust load of the rotor shaft of a turbocharger, the thrust bearing having a first and second opposed side surface, comprising:
    a first groove formed in said first side surface of the thrust bearing for holding lubricating oil supplied to the bearing;
    at least one first oil passage extending from the groove toward the axis of the rotor shaft;
    at least one second oil passage communicating with the first oil passage and having a plurality of oil holes connected thereto that extend respectively to a plurality of tapering land portions formed on said first and second side surfaces of said thrust bearing so that the axial thrust bearing clearance decreases in a direction of rotation of said shaft;
    a first and second leg portion defining a cut out portion formed exclusively in the lower end portion of the thrust bearing;
    a planar portion formed in the end surface of the thrust bearing along the first and second cut out portion and forming a portion of a closed loop; and
    a second groove formed between the planar portion and said surfaces on which the shaft bears wherein the oil holes are formed in proximity to a point of maximum thrust clearance of said tapering land portions.

2. A thrust bearing as set forth in claim 1, wherein said thrust bearing is asymmetrically shaped.

3. A thrust bearing as set forth in claim 1, wherein said oil holes are formed at opposite ends of said second oil passage and extend to said first and second opposed side portions.

* * * * *